United States Patent Office 3,509,073
Patented Apr. 28, 1970

3,509,073
ELECTRICALLY CONDUCTIVE ZINC OXIDE
Robert S. Bowman, Pittsburgh, Pa., assignor to St. Joseph Lead Company, New York, N.Y., a corporation of New York
No Drawing. Filed July 27, 1966, Ser. No. 568,153
Int. Cl. C01g 9/02; H01b 1/08
U.S. Cl. 252—518          6 Claims

ABSTRACT OF THE DISCLOSURE

Electrically conductive zinc oxide is prepared by heating non-conductive zinc oxide in the presence of an organic siloxane compound containing at least one lower alkyl group attached to silicon by a carbon-silicon bond at a temperature of from about 400° to about 650° C. in a non-oxidizing atmosphere.

---

This invention relates to the production of electrically conductive zinc oxide.

I have found that normally non-conductive zinc oxide, either French or American process, can be converted into an electrically conductive form by subjecting the zinc oxide to the action of an organic siloxane compound at a temperature in the range from about 400° to about 650° C.

The organic siloxane compounds useful in the method of the invention are silane derivatives having at least one organic radical per molecule attached to silicon by a Si—C bond and at least one Si—O bond per molecule. Typical of the siloxanes useful in the method of the invention are trimethyl ethoxy silane [Me$_3$SiOEt], hexamethyldisiloxane [(Me$_3$Si)$_2$O], tetramethyldisiloxane

[(Me$_2$HSi)$_2$O]

and methylsiloxane polymers of the type (MeHSIO)$_x$ in which $x$ is typically 3 to 6 and in which the polymer is usually cyclic in structure. These representative siloxanes are volatile, water-white liquids having boiling points in the range from 70° to 160° C. and are easy and safe to handle.

The method of the invention may be carried out in various ways. A non-oxidizing carrier gas such as nitrogen or carbon monoxide containing the siloxane vapor is passed through a body of zinc oxide heated to a temperature in the range from 400° to 650° C., or a body of zinc oxide containing the siloxane is heated to a temperature of 400° to 650° C. in the substantial absence of oxidizing gases. The amounts of siloxane compound used do not exceed 10% by weight of the zinc oxide and typically are in the range from about one-half percent to about five percent by weight.

The following are representative procedures for carrying out the method of the invention:

(A) A body of zinc oxide (6.0 gm.) to be treated is placed in a quartz reactor tube 23 mm. I.D. and is deaerated by passing a non-oxidizing gas at 100 ml./min. through the tube for several minutes. The tube is then placed in a preheated furnace while maintaining the stream of non-oxidizing gas. When the zinc oxide is at the desired temperature a predetermined amount of siloxane is injected into the tube upstream of the body of zinc oxide where it vaporizes into the stream of carrier gas. Ten minutes after injection, the reactor tube is removed from the furnace and the zinc oxide is cooled to room temperature in the stream of carrier gas.

Instead of injecting the siloxane into the reactor tube it can be vaporized into the stream of carrier gas by passing the gas through a vessel containing the siloxane and maintained at a temperature selected to vaporize the siloxane at a desired rate.

(B) The predetermined quantity of siloxane is vaporized into a carrier gas, which may be air, and the latter is passed into a body of zinc oxide in a fluidizing chamber at room temperature wherein the siloxane is adsorbed on the zinc oxide. The zinc oxide is then placed in the quartz reactor tube and deaerated for several minutes in a stream of non-oxidizing gas. The reactor is then placed in the preheated furnace for thirty minutes. After removing the reactor tube from the furnace, the zinc oxide is cooled to room temperature in a stream of non-oxidizing gas.

The following table summarizes the results obtained by procedures A and B treating an American process zinc oxide with cyclotetramethyltetrasiloxane (MeHSiO)$_4$, B.P. 140° C.

TABLE I

| Process | Carrier gas | Wt. percent siloxane | Processing Temp., °C. | Product characteristics | |
|---|---|---|---|---|---|
| | | | | Surface | Ohm-cm. resistivity |
| A | N$_2$ | 1.0 | 500 | Hydrophobic | 5.0×10$^3$ |
| A | N$_2$ | 1.5 | 500 | ....do........ | 9.6×10$^2$ |
| A | CO | 2.0 | 500 | ....do........ | 1.1×10$^3$ |
| A | CO | 2.0 | 450 | ....do........ | 4.7×10$^2$ |
| B | CO | 2.0 | 500 | Hydrophilic | 3.4×10$^2$ |
| B | CO | 2.0 | 400 | ....do........ | 6.2×10$^3$ |

It will be noted that the product obtained by procedure A is hydrophobic in character while that obtained by procedure B is hydrophilic. Silicon analyses indicate that in procedure A almost all of the silicon content of the siloxane used is retained on the zinc oxide while in procedure B only about one-half of the silicon content of the siloxane used is retained.

Table II shows the results obtained by treating an American process zinc oxide by procedure A at 450° C. with various siloxanes in carbon monoxide in amounts equivalent to 2% SiO$_2$ by weight of the zinc oxide.

TABLE II

| Wt. percent SiO$_2$ | Siloxane | Product characteristics | |
|---|---|---|---|
| | | Surface | Ohm-cm. resistivity |
| 2.0 | (EtO)$_4$Si | Hydrophilic | 8.6×10$^5$ |
| 2.0 | (EtO)$_3$SiMe | ....do........ | 2.1×10$^5$ |
| 2.0 | (EtO)$_2$SiMe$_2$ | Slightly hydrophobic | 4.6×10$^5$ |
| 2.0 | EtOSiMe$_3$ | Hydrophilic | 1.2×10$^4$ |
| 2.0 | (Me$_3$Si)$_2$O | Partially hydrophobic | 3.0×10$^3$ |
| 2.0 | (Me$_2$HSi)$_2$O | Hydrophobic | 1.9×10$^3$ |
| 2.0 | (MeHSIO)$_4$ | ....do........ | 1.2×10$^3$ |

These data show that the systematic removal of the ethoxy groups of ethylorthosilicate, (EtO)$_4$Si, and replacement by methyl and hydrogen groups consistently improves the conductivity of the products. The products become hydrophobic when the ethoxy groups have been replaced by methyl and hydrogen groups. Although both the dimethyl diethoxy siloxane [(EtO)$_2$SiMe$_2$] and the cyclotetramethyltetrasiloxane [(MeHSiO)$_4$] contain the O—Si—O system, the cyclotetramethyltetrasiloxane provides considerably more conductivity and a more hydrophobic product. The products in all cases are white or off-white in color.

Examination of the siloxane treated zinc oxides of the invention indicates that they have a siliceous surface which, in the case of the hydrophobic products, is believed to include silicone residues. The products are white or near white and are resistant to heat sintering. The hydrophobic products are readily dispersible in organic substances, such as oils, plastics, fibers, elastomers and the like, wherein they function as antistatic and/or delustering agents. The hydrophilic types are useful in hydrous coating compositions, as in the paper industry, when a more conductive surface or sub-surface is desirable.

I claim:

1. A method of preparing electrically conductive zinc oxide which comprises subjecting zinc oxide at a temperature of from about 400° to about 650° C. in a non-oxidizing atmosphere to the action of from about 0.5% to about 10% by weight of an organic siloxane compound containing at least one lower alkyl group attached to silicon by a carbon-silicon bond and having a boiling point not exceeding about 160° C.

2. A method as defined in claim 1 wherein the siloxane compound is brought into contact with the zinc oxide in admixture with a non-oxidizing gas.

3. A method as defined in claim 1 wherein the siloxane compound is a methylsiloxane polymer of the formula $(MeHSiO)_x$ wherein $x$ is 3 to 6.

4. A method as defined in claim 1 wherein the siloxane compound is a methylethoxysilane of the formula $Me_nSi(OEt)_{4-n}$ wherein $n$ is 1 to 3.

5. A method as defined in claim 1 wherein the siloxane compound is trimethylethoxysilane.

6. A method as defined in claim 1 wherein the siloxane compound is of the formula $(Me_nH_{3-n}Si)_2O$ wherein $n$ is 1 to 3.

References Cited

UNITED STATES PATENTS 3,155,504  11/1964  Damm et al. _____ 106—296 XR

J. D. WELSH, Primary Examiner

U.S. Cl. X.R.

23—148; 106—296; 117—100, 201